Patented Mar. 10, 1953

2,631,085

UNITED STATES PATENT OFFICE

2,631,085

PREPARATION OF BLACK OXIDE OF IRON

Leonard M. Bennetch, Bethlehem, Pa., assignor, by mesne assignments, to Reconstruction Finance Corporation, Philadelphia, Pa., a corporation of the United States No Drawing. Application April 2, 1947,
Serial No. 738,936

11 Claims. (Cl. 23—200)

It is among the objects of the invention to provide a process that yields from inexpensive raw materials a black oxide of iron product of high commercial value, and which process may be carried out without the need for pressure cookers or other expensive equipment, and without the need for a high order of skill in control of the process.

Another object is to provide a process of the above character by which black oxide of iron may be readily produced in particles of predetermined size controlled to be anywhere in the commercial range from the largest particles industrially used down to the smallest particles such as are used in coloring which requires high tinctorial value and including in said range particles of composition and size that afford the deepest jet black of maximum covering power.

To carry out the process ferric oxide hydrate ($Fe_2O_3.H_2O$) known as yellow oxide of iron is combined with ferrous oxide hydrate ($FeO.H_2O$) in an aqueous slurry to yield the desired unhydrated form of precipitated black magnetic oxide of iron or magnetite, $Fe_3O_4$ or $Fe_2O_3.FeO$. The reaction proceeds according to the following equation:

(1) 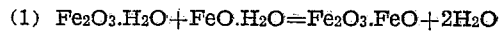
$Fe_2O_3.H_2O + FeO.H_2O = Fe_2O_3.FeO + 2H_2O$

Thus, one mol of the ferric oxide hydrate combines with one mol of the ferrous oxide hydrate, that is, by weight approximately two parts (65 per cent) of the ferric to one part (35 per cent) of the ferrous oxide hydrate are combined to produce the magnetite or black oxide of iron with the release of water. The ferric oxide hydrate may be viewed in the foregoing reaction as the nucleus or seed upon which the final black oxide of iron or magnetite is developed.

The process should be so controlled as to avoid any excess of the ferrous ingredient on the one hand or any considerable excess of the ferric ingredient on the other. While 65 per cent of the ferric component is preferred, as noted, were the proportions of ferric as high as 75 per cent, or somewhat higher, a black powder satisfactory for most purposes would be attained, but the brownishness of the product will increase with any considerable excess above 75 per cent of the ferric compound.

Should the proportion of ferrous hydrate materially exceed 35 per cent, the product would be greyish rather than jet black. To remedy such objection, a stream of air is passed through the slurry while the same is being heated, thereby to oxidize a sufficient proportion of the ferrous compound to ferric so as to attain the desired jet black by restoring the required ratio of ferric to ferrous compound. Of course, the ratio of components could be controlled to attain a product of any desired commercial shade of black.

During the reaction even slight acidity of the bath must be avoided as the ferrous ingredient would tend to dissolve instead of combining with the ferric seed particles. Therefore, the pH should be adjusted to be maintained at all times at a value no less than 7 and preferably somewhat in excess of 7.

The heating though conducted without resort to pressure cookers and in fact in open air, i. e., at atmospheric pressure, at around 200 degrees F. completes the reaction in about two hours, and yields particles of black oxide of iron, the size of which depends on the size of the ferric oxide hydrate seed employed.

After the treatment set forth the black slurry may be freed of any alkali by washing and decantation or may be pumped directly into a washing press and the washed cake dried and pulverized by standard methods to yield the final product of precipitated magnetite.

It will be understood that the foregoing reaction may be carried on with components of ferric oxide hydrate and ferrous oxide hydrate prepared in any conventional manner. However, certain advantages hereinafter pointed out follow, if the ferric oxide hydrate and the ferrous oxide hydrate are prepared in manner hereinafter set forth and such mode of preparation of the ingredients in combination with the process above described, constitutes a part of the process of the present invention in its more specific aspects.

In a preferred embodiment, the ferrous and the ferric oxide hydrates may be prepared successively in the same tank and subsequently reacted in said tank to yield black oxide of iron. This is done by combining ferrous sulfate solution with sufficient alkali, preferably sodium hydroxide at room temperature to precipitate approximately 65 per cent of the iron as ferrous oxide hydrate, which is insufficient to render the solution alkaline. The reaction proceeds according to the formula:

(2) $FeSO_4.7H_2O + 2NaOH$
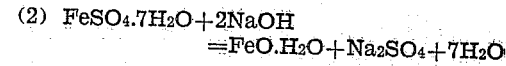
$= FeO.H_2O + Na_2SO_4 + 7H_2O$

The resultant slurry is then oxidized at room temperature with air to form yellow ferric oxide hydrate according to the following reaction:

(3) 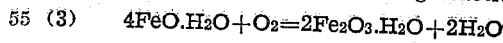 $4FeO.H_2O + O_2 = 2Fe_2O_3.H_2O + 2H_2O$

Thereupon the slurry is rendered slightly alkaline by adding preferably sodium hydroxide with the precipitation in such alkaline medium of the balance of the ferrous sulfate as ferrous oxide hydrate according to Formula 2.

The resultant mixture of ferric and ferrous oxide hydrate is thereupon subjected to the treatment earlier described, that is, for about two hours at around 200 degrees F. in order to produce the desired black oxide of iron according to the chemical reaction (1) above defined.

The foregoing process for preparing the ferric and the ferrous oxide hydrate in a common tank has the advantage that it assures the formation of the ferric oxide hydrate in the form of minute colloidal crystals, ideally small nuclei or seed upon which the ferrous oxide hydrate develops the magnetite in the fine state of sub-division frequently desired.

The ferrous and the ferric oxide hydrate components could, if desired, be prepared in separate tanks and subsequently combined in the proportion of 65% by weight ferric oxide hydrate to 35% ferrous oxide hydrate, and subjecting to treatment earlier described to produce black oxide of iron. Thus, instead of forming the ferrous oxide hydrate, and oxidizing part of it in one and the same tank in the manner above described to produce ferric oxide hydrate, the latter could be directly prepared in a separate tank by the addition of alkali reagent such as sodium hydroxide to hot aerated ferrous salt solution.

According to the present invention from another aspect, it is possible to produce black oxide of iron particles of any desired size within practical limits by predetermining the size of ferric oxide hydrate crystals used in the process, and doing so in manner commonly practiced in the production of yellow oxide of iron. Thereupon, according to the present invention, such yellow oxide of iron particles of predetermined size serve as the nucleus or seed upon which the black oxide of iron of predetermined size is developed by reaction with ferrous oxide hydrate in manner above described.

One procedure for obtaining the ferric oxide hydrate seed particles of desired size is to subject colloidal seed crystals of ferric oxide hydrate to hot ferrous salt solution in the presence of alkali under oxidizing conditions, as for instance by bubbling air therethrough. Yellow oxide of iron thus combines with the seed particles which progressively grow and the action is discontinued when the desired size of particle is reached.

Another procedure for obtaining ferric oxide hydrate seed particles of desired size is to mix with colloidal seed crystals of ferric oxide hydrate, metallic iron and to oxidize the latter by exposure to hot air at for instance from 150 to 170 degrees F. in the presence of ferrous sulphate solution, which latter serves as a catalyst. Here also the size to which the seed or nuclei grows is controlled at will by the time of the treatment. This method of preparing the ferric oxide hydrate particles of predetermined size has the advantage of economizing the use of alkali for precipitation and may in certain cases be more economical than the processes that were above described in greater detail.

The yellow oxide of iron particles thus grown from the colloidal seed by one of the methods described in the last two paragraphs are subsequently subjected to the reaction (1) above set forth, for the chemical combination therewith of ferrous oxide hydrate to produce magnetite or black oxide of iron of the particle size corresponding to that of the seed size employed.

Thus the present invention requires but simple equipment and no great amount of skilled supervision to produce black oxide of iron in predetermined particle size controlled to be of the desired commercial shade of black and of the desired tinctorial value when used for pigmentation, or to be of the desired predetermined size for optimum suitability for each of any of various possible industrial uses of the product.

As many changes could be made in the above process and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A process of manufacturing black oxide of iron which comprises heating a slurry of ferric oxide hydrate and ferrous oxide hydrate of pH not less than 7 in proportions by weight respectively of 65 to 75 per cent and 35 to 25 per cent to a temperature of about 200 degrees F. and maintaining said temperature for about two hours.

2. A process of manufacturing black oxide of iron which comprises heating a slurry at a pH of not less than 7 of approximately two parts by weight of ferric oxide hydrate and one part of ferrous oxide hydrate to a temperature of about 200 degrees F. and maintaining said temperature for about two hours.

3. A process of manufacturing black oxide of iron, which comprises heating a slurry at pH of not less than 7 of ferric oxide hydrate and ferrous oxide hydrate in proportions by weight of about 65 per cent ferric to about 35 per cent of the ferrous compound to a temperature of about 200 degrees F. and maintaining said temperature for about two hours.

4. A process of manufacturing black oxide of iron which comprises reacting at atmospheric pressure for about two hours at a temperature of about 200 degrees F. and in a slurry of pH not less than 7 ferric oxide hydrate and ferrous oxide hydrate in relative proportions by weight of about 65 per cent of the ferric to about 35 per cent of the ferrous compound.

5. A process of manufacturing black oxide of iron which comprises the preparation of ferric oxide hydrate, the separate preparation of ferrous oxide hydrate, mixing about two parts by weight of the former with one part by weight of the latter in a slurry of pH not less than 7 and heating the resultant mixture at a temperature of about 200 degrees F. for about two hours to form the black oxide of iron.

6. A process of manufacturing black oxide of iron which comprises the precipitation of ferrous oxide hydrate, oxidation of the precipitated ferrous oxide hydrate to produce ferric oxide hydrate, precipitation of ferrous oxide hydrate in a common tank to yield substantially two parts by weight of the ferric oxide hydrate to one part of the ferrous oxide hydrate and thereupon heating the said ferric and ferrous components in the proportions stated in a slurry of pH of not less than 7 at a temperature of about 200 degrees F. and at atmospheric pressure.

7. A process of manufacturing black oxide of iron which comprises treating ferrous salt with alkali to form ferrous oxide hydrate, oxidizing the same to ferric oxide hydrate, mixing the ferric oxide hydrate with ferrous oxide hydrate in such proportions that the two ingredients, ferrous oxide hydrate and ferric oxide hydrate are present in substantially equimolar proportions, and heating the mixture in a slurry of pH of not less than 7 and under atmospheric pressure to produce black oxide of iron.

8. A process of manufacturing black oxide of iron which comprises treating ferrous salt with alakli to form ferrous oxide hydrate, oxidizing said ferrous compound to ferric oxide hydrate by introducing a stream of air therethrough at atmospheric temperature, mixing the ferric oxide hydrate thus produced with ferrous oxide hydrate in a slurry and in such proportions that the two ingredients are present in substantially equimolar proportions and thereupon heating the product under atmospheric pressure at a temperature of about 200 degrees F. while maintaining the pH of the slurry at at least 7.

9. A process of manufacturing black oxide of iron which comprises mixing in a slurry with very fine ferric oxide hydrate seed particles, ferrous oxide hydrate in substantially equimolar proportions, heating the slurry at a pH of not less than 7 for about two hours under atmospheric pressure at a temperature of approximately 200° F., resulting in completion of the chemical reaction, removing soluble matter by washing in water, drying and pulverizing the final product.

10. A process of manufacturing black oxide of iron which comprises effecting the growth of colloidal crystals of ferric oxide hydrate by exposure of metallic iron to hot air in the presence of ferrous sulphate solution at temperature of approximately 200° F. to build ferric oxide hydrate upon said colloidal crystals until the crystals have reached a predetermined size and thereupon reacting such particles with ferrous oxide hydrate in substantially equimolar proportions and in a slurry at a pH of not less than 7 to produce black oxide of iron.

11. A process of manufacturing black oxide of iron, which comprises treating ferrous sulphate with alkali to form ferrous oxide hydrate, oxidizing at atmospheric temperature the ferrous oxide hydrate thus formed to ferric oxide hydrate, oxidizing iron in the presence of ferrous sulphate solution and the said ferric oxide hydrate to increase the particle size of the ferric oxide hydrate, mixing the ferric oxide hydrate of increased particle size with ferrous oxide hydrate to produce a slurry containing equimolar proportions of the ferrous oxide and ferric oxide hydrates, and heating the slurry for about two hours under atmospheric pressure at a temperature of about 200 degrees F. while maintaining the pH of the slurry at at least 7 to produce black oxide of iron.

LEONARD M. BENNETCH.

REFERENCES CITED

The following references are of record in the file of this patent:

UNITED STATES PATENTS

| Number | Name | Date |
| --- | --- | --- |
| 802,928 | Fireman | Oct. 24, 1905 |
| 1,327,061 | Penniman et al. | Jan. 6, 1920 |
| 1,368,748 | Penniman et al. | Feb. 15, 1921 |
| 2,127,907 | Fireman | Aug. 23, 1938 |
| 2,133,267 | Ayers | Oct. 18, 1938 |
| 2,388,659 | Ryan et al. | Nov. 6, 1945 |
| 2,419,240 | Wilson | Apr. 22, 1947 |

FOREIGN PATENTS

| Number | Country | Date |
| --- | --- | --- |
| 23,859 of 1900 | Great Britain | June 22, 1901 |

OTHER REFERENCES

Hilpert, "Journal of Iron and Steel Institute," vol. 82, No. 11, pages 65, 66 (1910).

Mellor, "Comprehensive Treatise on Inorganic and Theoretical Chemistry," vol. 13, pages 718, 732, 740, 838 (1934). Publ. by Longmans, Green and Co., N. Y. C.